United States Patent [19]

Putman et al.

[11] Patent Number: 4,745,758
[45] Date of Patent: May 24, 1988

[54] SYSTEM FOR ECONOMIC UNIT LOAD DISTRIBUTION DURING PROCESS LOAD TRANSITION

[75] Inventors: Richard E. Putman, Penn Hills Twp., Allegheny County, Pa.; Katherine A. Gundersen, Chicago, Ill.

[73] Assignee: Westinghouse Electric Corp., Pittsburgh, Pa.

[21] Appl. No.: 942,947

[22] Filed: Dec. 15, 1986

Related U.S. Application Data

[63] Continuation of Ser. No. 860,932, May 8, 1986, abandoned.

[51] Int. Cl.[4] .................................................. F01K 13/02
[52] U.S. Cl. ............................................ 60/676; 60/664; 60/667
[58] Field of Search ................... 60/660, 664, 667, 676

[56] References Cited

U.S. PATENT DOCUMENTS 4,069,675  1/1978  Adler ................................ 60/676 X
4,418,541 12/1983  Russell ............................. 60/676 X Primary Examiner—Allen M. Ostrager
Attorney, Agent, or Firm—G. E. Hawranks

[57] ABSTRACT

In a plant including a multiplicity of energy conversion units which together supply load upon demand to a given process through a common junction, a system is included to economically optimize the load distribution among the multiple units dynamically during the transition of process load demand from one state to another such that when the process load supply reaches the other process demand state, the energy conversion units are substantially in their economically optimum individual load generating states. Typical unit load dispatching plants may include a boiler house in which a multiplicity of boilers are coupled to a common header for supplying stream flow to the particular process, a power turbogeneration system in which a multiplicity of turbogenerating units supply power to a power system network through a common bus and a heat exchange industrial process in which a multiplicity of power-driven compressors are used together with corresponding chiller units for maintaining the temperature of a common coolant under varying coolant flow demand conditions.

15 Claims, 7 Drawing Sheets

SYSTEM FOR ECONOMIC UNIT LOAD DISTRIBUTION DURING PROCESS LOAD TRANSITION

This application is a continuation of application Ser. No. 860,932 filed May 8, 1986, abandoned.

BACKGROUND OF THE INVENTION

The present invention relates in general to the energy management of a multiplicity of energy conversion units which together supply load upon demand to a given process through a common junction, and more particularly to a system which economically optimizes the load distribution among the multiple units dynamically during the transition of process load demand from one state to another such that when the process load supply reaches the other process demand state, the energy conversion units are substantially in their economically optimum individual load generating states.

Typical unit load dispatching plants may include a boiler house in which a multiplicity of boilers are coupled to a common header for supplying steam flow to the particular process, a power turbogeneration system in which a multiplicity of turbogenerating units supply power to a power system network through a common bus, and a heat exchange industrial process in which a multiplicity of power-driven compressors are used together with corresponding chiller units for maintaining the temperature of a common coolant under varying coolant flow demand conditions, for example. In each case, the total load demand of the process is supplied cooperatively and coordinately by the individual energy conversion units used for the particular application. By optimizing the energy conversion units for equal incremental cost unit load supply to yield the process demand load, a substantial cost savings can be achieved.

Typical state of the art optimizing procedures and control systems for economic load allocation of a multiplicity of load generating units for a given steady state total load demand of the process are described in the following papers:

(1) "Optimization of Non-Linear Power Plant Systems" by R. E. J. Putman, published in Proc. IASTED Conf., pages 1-6, June, 1978;

(2) "Optimal Boiler Load Allocation in Distributed Control" by T. N. Matsko et al., published in Proc. American Control Conf., pages 1140-1145, June, 1982.

While the optimizing systems of the aforementioned types do provide one or more methods for economic unit load dispatching of a multiplicity of energy conversion units, they propose to do so solely at steady state process load demand conditions. In other words, the optimization procedure is relaxed or suspended during load demand transitions. As described in the Matsko paper referenced above, all of the energy generating units are moved in load supply according to the change in process load to satisfy the process demand, then a separate reallocation is effected to equalize the incremental load costs among the individual load supply units while maintaining the total steady-state load demand. Accordingly, such control systems separate the demand control from the optimal reallocation procedure for the transient and steady-state conditions.

In those cases in which the energy generating units are moved unnecessarily in trying to support the load during the process load transition and then are moved again at the final steady-state condition according to a reallocation in unit load to equalize the incremental load costs among the individual units, the result is an undesirable waste of fuel in having to govern the energy generating units through the unnecessary load transitions, not to minimize the effects of wear and tear on the units themselves in being operated through such transitions.

Clearly, it would be economically advantageous to avoid this unnecessary waste of fuel by determining before-hand which boilers should be altered in unit load supply and in what direction to achieve the optimum economic unit load distribution for a process load demand transition. It is understood that according to their individual efficiency characteristics, some load supply units may be increased in load, some decreased in load and some may not be required to alter their load supply at all in order to achieve the optimum economic unit load distribution in the transition from one process load demand to another. The present invention proposes a system which is operative to make judgments as to how to operate the individual units collectively during a process load transition as well as at steady-state to achieve the aforementioned desired result.

SUMMARY OF THE INVENTION

A multiplicity of energy conversion units all coupled to a common junction supply load upon demand to a process. A first controller generates a first signal to govern the energy conversion units to collectively supply load to the process in accordance with the process load demand. A second controller, corresponding to each energy conversion unit and governed by a corresponding second signal, controls the energy input of its corresponding energy conversion unit to achieve a desired unit load supply therefrom which contributes to the process load demand.

In accordance with the present invention, a system is included for allocating load dynamically and economically among the multiplicity of energy conversion units to meet the process load demand during a transition from one steady-state loading condition to another. As part of the system, a load allocator calculates a cost of operating each energy conversion unit across its corresponding load supply spectrum based on corresponding efficiency characteristics of each unit determined from data measurements collected over the load supply spectrum of its corresponding unit, determines an instantaneous process load demand, and derives a set of unit load supply signals corresponding to each energy conversion unit to meet the instantaneous process load demand and virtual perturbations therefrom based on an optimal economic unit load supply distribution algorithm using the cost of operating calculations for the instantaneous and virtually perturbed values of process load demand. At least one gain control signal, a bias signal, and a demand signal are generated for each energy conversion unit based on a function of the corresponding set of unit load supply signals or a portion thereof.

The present invention further includes a load controller for each energy conversion unit. Each load controller is governed by the first signal to generate the second signal which controls the corresponding energy conversion unit to render a desired unit load supply to meet the change in process load demand during the transition. The load controller generates a third signal based on a function of the first signal and corresponding demand signal. Each load controller is governed by the corresponding at least one gain signal to gain adjust the third signal and render a fourth signal representative of the gain adjusted third signal. Each load controller generates its corresponding second signal based on a function of the fourth and bias signals.

DESCRIPTION OF THE PREFERRED EMBODIMENT

Figure 1:
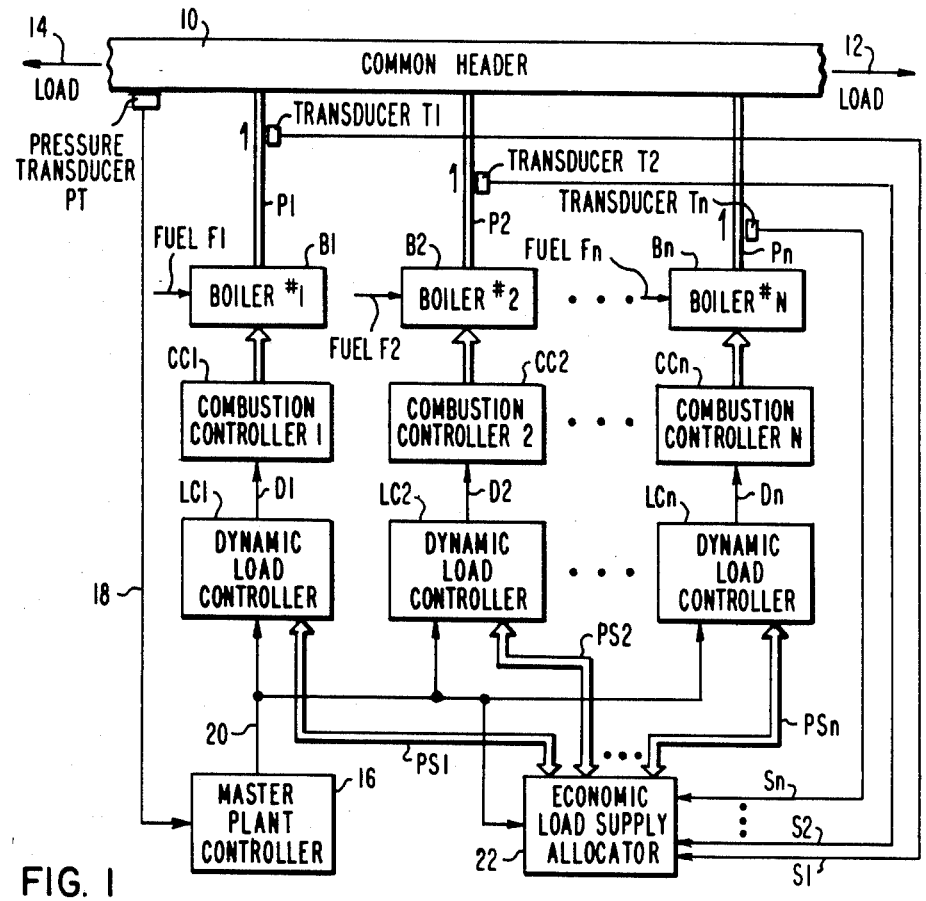
FIG. 1 is a block diagram schematic of a boiler house plant suitable for embodying the principles of the present invention.

FIG. 1 is a block diagram schematic of a boiler house plant including a multiplicity of boilers B1, B2, ... Bn operated as energy conversion units with each having an energy input of fuel such as coal, oil, gas, or combinations thereof, for example, shown at F1, F2, ... Fn. All of the boilers B1, B2, ... Bn are coupled to a common steam header 10 through individual piping P1, P2, ... Pn for supplying their respective unit steam loads upon demand to a process (not shown). The energy inputs of each boiler B1, B2, ... Bn are controlled by a corresponding conventional combustion controller CC1, CC2, ... CCn, respectively, to achieve a desired unit load supply therefrom which contributes to the process load demand shown at 12 and 14. A conventional master plant controller 16 monitors the steam pressure of the common header 10 utilizing a pressure transducer PT which generates a pressure signal 18 to the master plant controller 16. In response to the monitored steam pressure signal 18, the controller 16 generates a governing signal 20 which is provided to each of a multiplicity of dynamic load controllers LC1, LC2, ... LCn which correspond to the boilers B1, B2, ... Bn.

As part of a system for allocating load dynamically and economically among the multiplicity of the boilers to meet the process load demand during a transition from one steady state loading condition to another, there is provided an economic load supply allocator 22 which monitors and responds to the load governing signal 20 and signals collectively representing the instantaneous process load demand which signals may be rendered by steam flow transducers T1, T2, ... Tn coupled respectively to the output piping P1, P2, ... Pn of the boilers and which transducers generate signals S1, S2, ... Sn representative of the unit steam flows of the boilers B1, B2, ... Bn, respectively, contributing to the process load demand. In response to the aforementioned governing and transducer signals, the allocator 22 generates a plurality of signals PS1, PS2, ... PSn to the respectively corresponding dynamic load controls LC1, LC2, ... LCn. Each of the load controllers LC1-LCn is governed by the governing signal 20 and allocator generated signals PSi to generate in each case signals D1, D2, ... Dn for controlling their corresponding boilers B1, B2, ... Bn to render a desired unit load supply to meet the change in process load demand during the aforementioned transition. The economic load supply allocator 22 and dynamic load controllers LC1, LC2, ... LCn will be described in greater detail for a better understanding of the operations thereof in the following paragraphs.

Figure 2:
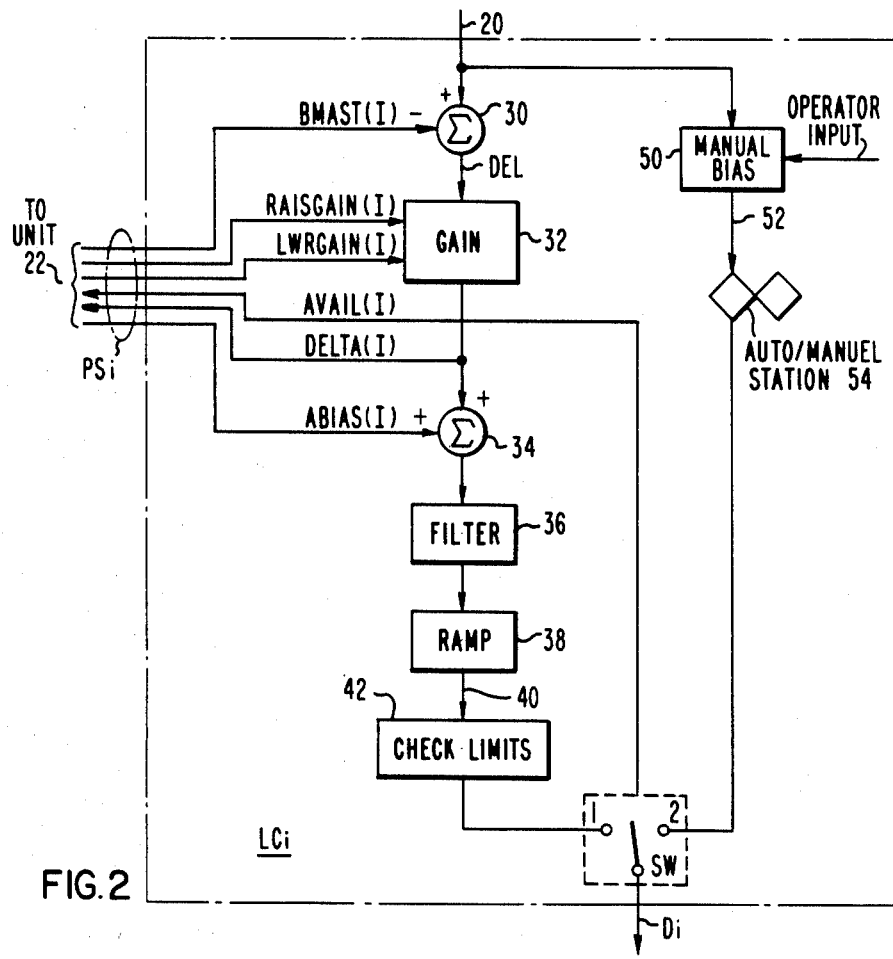
FIG. 2 is a functional block diagram schematic of a typical dynamic load controller suitable for use in the embodiments depicted in FIGS. 1, 9 and 11.

A functional block diagram schematic of a typical dynamic load controller LCi is shown in FIG. 2. The signals which are communicated to the load controller LCi from the allocator 22 and which will be described in greater detail hereinbelow are denoted as BMAST(I), RAISGAIN(I), LWRGAIN(I), and ABIAS(I). Signals which may be monitored by the allocator 22 from a typical load controller LCi are denoted as AVAIL(I) and DELTA(I). Within each load controller LCi the governing signal 20 and the signal BMAST(I) are provided to a summing function 30 which generates the difference therebetween denoted as DEL. The difference signal DEL is provided to a gain adjusting function 32 wherein the signals RAISGAIN(I) and LWRGAIN(I) are used to gain adjust the signal DEL to effect the signal denoted as DELTA(I). Moreover, the signals DELTA(I) and ABAIS(I) are summed in a summer unit 34 and the resulting signal may be filtered in a filter unit 36 and thereafter may be ramped at a predetermined rate in a ramping unit 38. The resulting ramped signal 40 is limited to upper and lower boundaries by the unit 42 and coupled to one position of a single-pole-double-throw switch denoted as SW or a logic transfer module.

Figure 3:
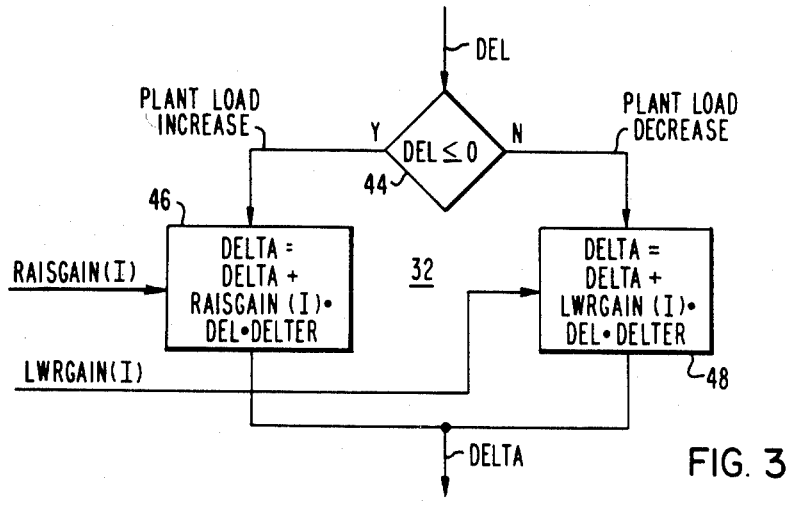
FIG. 3 is a program flow chart suitable for embodying the gain function of a load controller in a digital signal processor.

The gain function 32 may be embodied in a digital signal processor like a microcomputer or the like, for example, and may take upon the functions depicted in the flow chart of FIG. 3. Referring to FIG. 3, the difference signal DEL may be monitored by a decisional block 44 which determines if it is less than or equal to zero or greater than zero. If the former, then the calculation in block 46 using signal RAISGAIN(I) is carried out and if the latter the calculation in block 48 using signal LWRGAIN(I) is performed. In either case, the gain adjusted signal DELTA is effected. The equations shown in the block 46 and 48 are conventional digital signal processing equations for gain adjustment.

Referring back to FIG. 2, within the load controller I, the governing signal 20 may also be conducted to a manual bias unit 50 where an operator can input a bias to be added to the governing signal 20. The resulting biased signal 52 may be conducted to a conventional auto manual station 54 which may be operated in either an auto or manual state. When in the auto state the station 54 passes the biased signal 52 to the second position of the switch SW. But, when the station 54 is in the manual state a manual signal supplied by the station 54 is substituted for the biased signal 54. The switch SW may be operated between the first and second position signals to permit the signals coupled thereto to be substituted for each other as the combustion controller governing signal Di. The signal AVAIL(I) is provided from the switch SW to the allocator 22 for each load controller and indicates when the switch is in position 1 and available for economic load dispatch. When SW is in position 2, the load controller bypasses the gain adjustment and unit load allocation functions rendering it unavailable for economic load dispatch.

Figure 4:
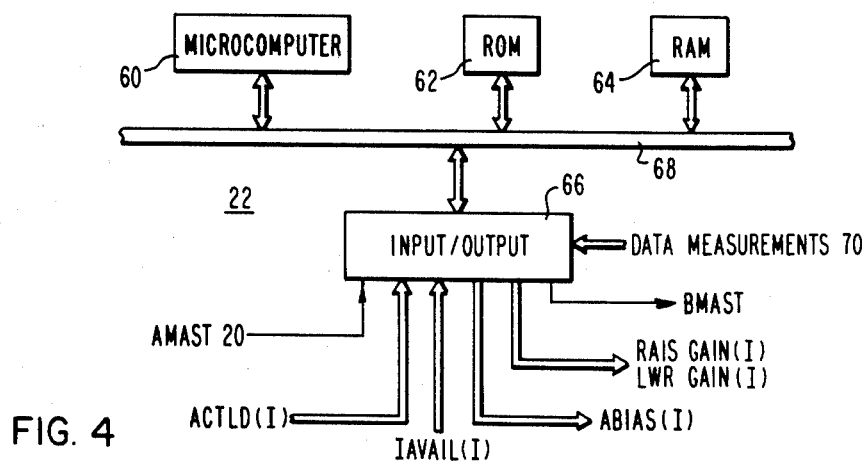
FIG. 4 is a block diagram schematic of a digital signal processing system suitable for embodying the economic load supply allocator depicted in the embodiments of FIGS. 1, 9 and 11.

The allocator 22 may be embodied in a digital signal processing system such as a microcomputer system, for example, which is depicted in the block diagram schematic of FIG. 4. Referring to FIG. 4, conventional system components such as a microcomputer or microprocessor 60, a read-only memory (ROM) 62, a random access memory (RAM) 64 and an input/output unit or units 66 are all coupled to a microcomputer bus 68 for exchanging digital data information therebetween. For example, the ROM 62 may store instructions and data digital words for governing the processing operations of the microcomputer 60 through its derivations, calculations, and logic and register exchange operations. Temporary data resulting from the microcomputer processing or data collection via the input/output unit 66 may be stored in the RAM 64. All of the signal information exchanged between the load controllers LC1, LC2, ... LCn and the allocator 22 are conducted through the input/output unit 66 as well as raw data measurements from the fuel consumption, flue gas temperature, and other conditions of the boilers B1, B2, .. . Bn. A more detailed explanation of the computer processing of the allocator 22 will be described hereinbelow in connection with the program flow charts of FIGS. 5, 7 and 8.

Figure 5:
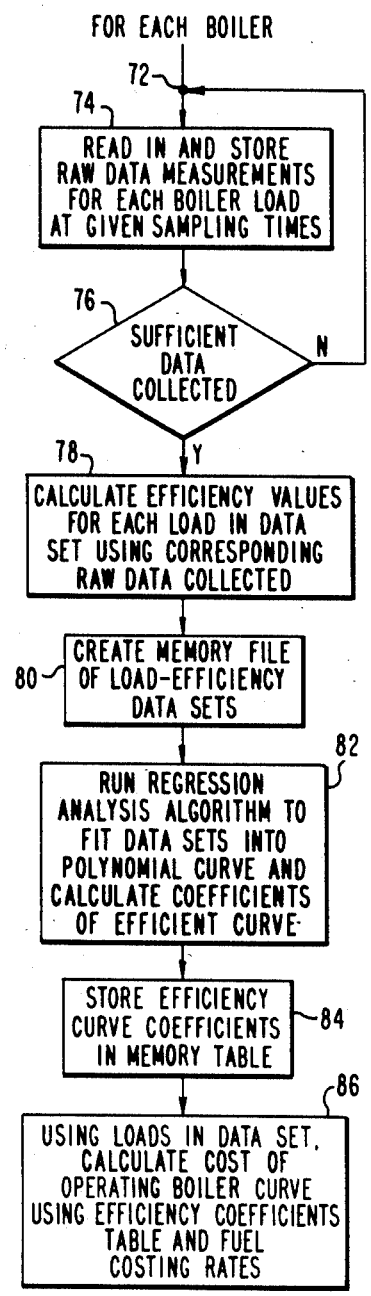
FIG. 5 is a program flow chart suitable for use in programming a digital signal processing system for calculating the cost of operating at least one energy conversion unit across its corresponding load supply spectrum based on corresponding efficiency characteristics thereof determined from data measurements collected over the corresponding load supply spectrum.

The flow chart of FIG. 5 represents a program for execution in the microcomputer system 22 for calculating a cost of operating each boiler B1-Bn across its corresponding load supply spectrum based on corresponding efficiency characteristics of each boiler determined from the data measurements 70 collected over the corresponding load supply spectrum thereof. Typically, in initializing the load allocating system, the plant boilers are exercised through their load supply spectrums over a period of a few days. During this time, the flow chart of FIG. 5 starting at point 72 may execute the instruction at 74 once each minute, for example, to read in and store the raw data measurements for each boiler load at the given minute sampling times. The decisional block 76 determines when the amount of raw data initially collected is sufficient. A total of 50 data sets may be, in some cases, a sufficient initial collection of data to compute boiler efficiency versus load relationship. In the next instruction 78, for each boiler, the input/output boilder efficiency is calculated using the raw data collected at the corresponding boiler loads. A memory file for the storage of 50 load-efficiency data sets calculated may be created in the RAM 64 through the instruction 80.

In instruction 82, each load-efficiency data set may be presented to an optimizing program as a starting condition, the program calculating the starting operating cost of each boiler using the efficiency tables and fuel costing rate of the corresponding boiler. More specifically, in the present embodiment, a regression analysis algorithm is run in the instruction 82 to fit the load-efficiency data sets of the file created in instruction 80 into a polynomial efficiency curve of the following expression:

$$\eta = a_0 + a_1 * L + a_2 * L * M - a_3 * L^2,$$

where
$\eta$ = efficiency,
L = boiler loads,
M = fuel heat input ratio (e.g. oil/gas heat).

Figure 6:
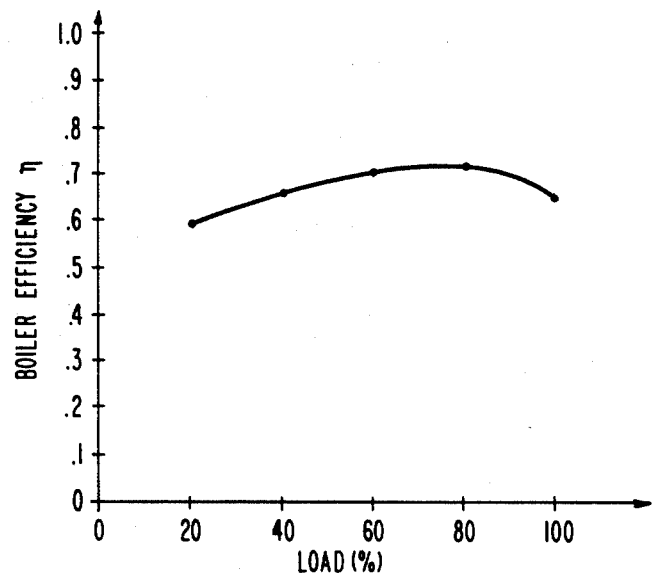
FIG. 6 is a graph illustrating an exemplary efficiency curve for a boiler.

The polynomial coefficients $a_0$–$a_3$ of the above equation are calculated for each boiler load-efficiency data set to produce an efficiency curve or family of curves for different fuels with respect to load. An exemplary illustration of an efficiency curve for a boiler is shown in the graph of FIG. 6. The coefficients $a_0$ through $a_3$ may be calculated to achieve such a curve with the goal to achieve the best fit through various load-efficiency data points represented by the darkened dots in FIG. 6. Each set of polynomial coefficients defining the efficiency curve for each boiler may be stored in a memory table in the RAM 64 using instruction 84. In the next instruction 86, the cost of operating each boiler may be calculated using the loads of the data set, the corresponding polynomial efficiency coefficients $a_0$–$a_3$ and the fuel costing rates associated therewith, all of which being stored in the RAM 64.

Figure 7:
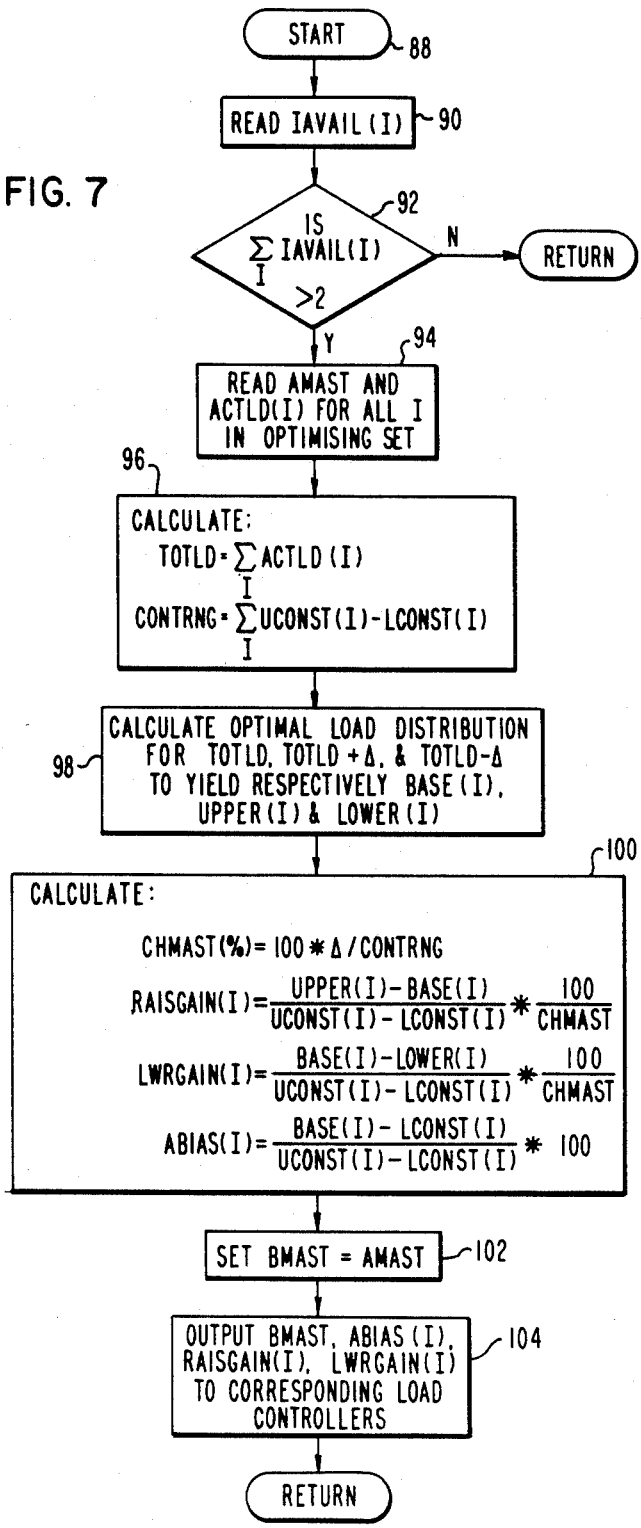
FIG. 7 is a flow chart suitable for use in programming a digital signal processing system for deriving set of unit load supply signals corresponding to each energy conversion unit to meet an instantaneous process load demand and virtual perturbations therefrom based on an optimal economic unit load supply distribution algorithm using the cost of operating calculations from the flow chart of FIG. 5.

The flow chart of FIG. 7 is representative of a program for execution in the microcomputer system 22 for deriving a set of unit load supply signals corresponding to each boiler to meet an instantaneous process load demand and virtual perturbations therefrom based on an optimal economic unit load supply distribution algorithm using the cost of operating calculations from the flow chart of FIG. 5 for the instantaneous and virtual perturbation values of process load demand. Referring to FIG. 7, the program execution commences with the instruction block 90 in which the flags IAVAIL(I) from the dynamic load controllers LC1-LCn are read into the microcomputer system 22. Each flag IAVAIL(I) is indicative of the corresponding boiler I being within the optimizing set for economic unit load distribution. The decisional block 92 determines if there are more than two boilers in the optimizing set. If not, it is unnecessary to continue program execution beyond this point and program execution is returned to the starting point 88 to be run again at the next execution interval.

With more than two boilers in the optimizing set, the instruction 94 is executed to read and store the governing signal 20 which has the mnemonic AMAST. The signals S1 through Sn representing the actual steam flow from the individual units to the common header denoted as ACTLD(I) are also read and stored in the RAM 64 for all of the boilers I in the optimizing set. In the next instruction 96, the instantaneous process load demand denoted as TOTLD is calculated by summing all of the measured steam flows ACTLD(I). In addition, an overall load control range denoted as CONTRNG is calculated by taking the difference between the upper control range UCONST(I) and the lower control range LCONST(I) for each of the units I in the optimizing sets and summing them together.

Next, in the instruction 98, an optimal load distribution is calculated for the instantaneous process load TOTLD, and virtual perturbations $\Delta$ therefrom denoted as TOTLD+$\Delta$ and TOTLD−$\Delta$ are calculated to yield the set of unit load supply signals denoted as BASE(I), UPPER(I) and LOWER(I), respectively, for each of the units I in the optimizing set. The optimizing procedure or algorithm may include the steps:

(1) assign the measured loads ACTLD(I) among all of the units as a starting point for the optimal load distribution of TOTLD and establish an initial total cost C using the cost of operating curves determined in the instruction 86 of the flow chart described in connection with FIG. 5;

(2) then, using the cost of operating versus load curves for each of the units in the optimizing set, establish an incremental cost change $\delta C$ if the initial loading distribution were to be perturbed on each unit by an identical and discrete amount in both directions;

(3) then, select that unit which would provide the largest cost savings if its unit load were to be lowered by the perturbed amount, together with that other unit which would contribute lowest to the cost increase if its unit load were to be raised by the perturbed amount;

(4) modify the unit load distribution among the boilers in the optimizing set according to the selections determined from step (3);

(5) calculate a new total cost and repeat the above steps (1) through (4) if a cost improvement has resulted, and continue the procedure until no further cost improvement can be obtained.

The resulting load distribution for TOTLD using the above procedure is denoted as BASE(I).

Accordingly, the above optimizing procedure may be repeated for the virtually perturbed instantaneous process demand loads of TOTLD+$\Delta$ and TOTLD−$\Delta$ to yield the unit load distributions UPPER(I) and LOWER(I), respectively. For a more detailed description of the aforementioned optimizing procedure, reference is made to the Putman paper entitled "Optimization of Non-Linear Power Plant Systems" referred to hereabove in the background section which is incorporated by reference in the instant application. The above-optimizing technique is referred to as the equal incremental cost load distribution algorithm.

An alternative approach for optimal load distribution among the units in the optimizing set is the simplex self-directing evolutionary operation (SSDEVOP) algorithm which operates to ultimately afford the unit load demand distribution based on the lowest total cost operating figure derived from the cost of operating curves calculated from the flow chart of FIG. 5. Descriptions of the SSDEVOP algorithm are found in the papers: (1) "Designing Energy Management Systems" by Richard E. J. Putnam, presented at PIMA, March, 1985; and (2) "Process Improvement With Simplex Self-Directing Evolutionary Operations" by B. H. Carpenter et al., published in *Chemical Engineering*, July 5, 1965, which are both incorporated by reference herein.

In the next instructional block 100, the gain control signals RAISGAIN(I) and LWRGAIN(I) are calculated for each of the units I in the optimizing set based on functions of their corresponding set of unit load supply signals BASE(I), UPPER(I) and LOWER(I). The gain control signals are normalized to the unit load control range of their corresponding boilers. In addition, the bias signal ABIAS(I) is also calculated for each unit I in the optimizing set based on the unit load supply BASE(I). Further, in the next instructional block 102 the signal BMAST is set substantially equal to the monitored governing signal AMAST. Next, in block 104, the aforementioned calculated and set signals are output from the microcomputer system 22 to their corresponding load controllers. Thereafter, the program execution is returned to its starting point 88 to wait for re-execution.

Figure 8:
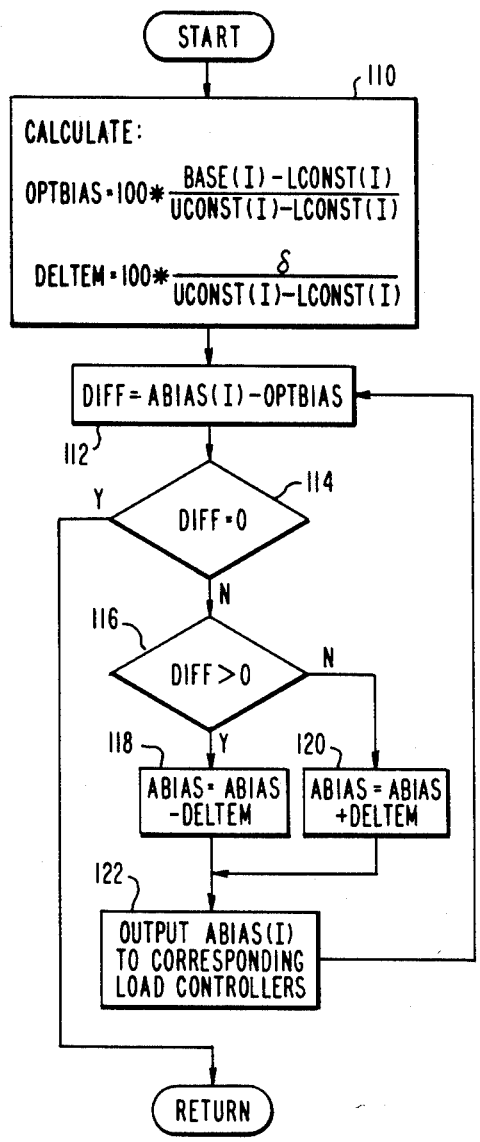
FIG. 8 is a flow chart suitable for use in programming a digital signal processing system to ramp the bias signals which are supplied to their corresponding load controllers as depicted in the embodiment of FIG. 2.

As described hereabove in connection with the embodiment of FIG. 2, the bias signal ABIAS(I) is ramped within its corresponding load controller I after being added to the gain adjusted signal DELTA(I). In the alternative, the bias signal ABIAS(I) may be ramped in the program execution of the microcomputer system 22. A suitable flow chart for that program execution is depicted in FIG. 8. Referring to FIG. 8, the program starts with the execution block 110 in which the new bias signal denoted as OPTBIAS is calculated along with its ramping incremental change denoted as DELTEM. In the following instructional block 112, the difference between the old bias signal and the new bias signal is taken and in the decisional block 114, this difference is compared with a zero value or something substantially close thereto. If the difference signal DIFF falls within the zero range, then the program execution is returned to the starting point; otherwise, a decision in block 116 is made to determine if DIFF is greater than or less than the zero range and resulting from this determination, the bias signal is either decremented in 118 or incremented in 120 by the incremental amount DELTEM. The resulting set of bias signals ABIAS(I) are output to their corresponding load controllers according to the block 122 and thereafter program execution is continued in the instructional block 112. The execution of the loop instructions between 112 and 122 is repeated until the difference signal DIFF falls within the zero range as determined by the block 114 in which case the program execution is returned to its starting point.

In a typical operation of the boiler plant and load allocation system, it is given that initially the boilers may be controlled through their load supply spectrums over a number of days to permit the microcomputer system of the load allocator 22 to collect enough raw data measurements from each of the boilers to compute a cost of operating boiler curve for each of the boilers B1 through Bn in accordance with the flow chart described in connection with FIG. 5. The program of FIG. 5 may also be executed on the order of once an hour to update the cost versus load curves for the various boilers according to the new raw data collected over the previous hour. In this manner, the cost versus load curves for the individual boiler units are changed as their corresponding boiler efficiency changes with time. Thus, having the cost versus load curves for the boiler units stored in the RAM 64 and updated periodically, the load supply allocator 22 may dynamically and efficiently distribute load among the boilers in accordance with the governing demand signal 20 generated by the master plant controllers 16. The flow chart program described in connection with FIG. 7 and the dynamic load controllers described in connection with FIG. 2 operate cooperatively to achieve this objective.

For example, the master plant controller 16 responds to a change in load condition as reflected by the signal generated by the pressure transducer PT. The governing signal 20 generated in response to the load change is monitored by the load allocator 22 along with the individual loads supplied by the boilers to the common header as represented by the signals S1 through Sn or ACTLD(I). During the load change, the program of FIG. 7 may be executed on the order of every five minutes or so to monitor those boilers within the optimizing set and to generate the gain, bias and other signals necessary for load distribution through the operation of the dynamic load controllers LC1 through LCn. Accordingly, the bias signal provides the economic unit load supply demand and the gain signals adjust the bias signal during the interim period between program executions for a change in governing signal 20 in either an increasing or a decreasing direction. Thus, the changes of total load within the limits of the virtual perturbations will follow the optimal distributions.

The ramping function of either the load controller or the load allocator as the case may be provides a further smoothing affect towards economic unit load distribution during the process flow demand change from one steady-state loading condition to another. Thus when the unit load supply distribution eventually meets the final steady-state process loading condition it will have already been optimally economized. That is, the differentiated control of the load change on each boiler is controlled so as to maintain optimal distribution during the process load demand transitions. This is accomplished through the automatic gain control operations of the dynamic load controller so as to reduce the variance of control of the common steam header pressure by the master plant controller 16. This automatic gain control operates as a function of the number of boilers in operation and their capacities.

Each of the load controllers LC1 through LCn include the switch SW for bypassing the automatic gain control function thereof. More specifically, when the switch SW is transferred to the position 2 the governing signal for the corresponding combustion controller is taken from either the governing signal 20 generated by the master plant controller 16 or from a manually operator controlled signal via the auto/manual station 54. The corresponding state is conveyed to the load allocator 22 via the flag AVAIL(I). Accordingly, when in the bypass state, a load controller and corresponding boiler are no longer considered within the optimizing set.

Figure 9:
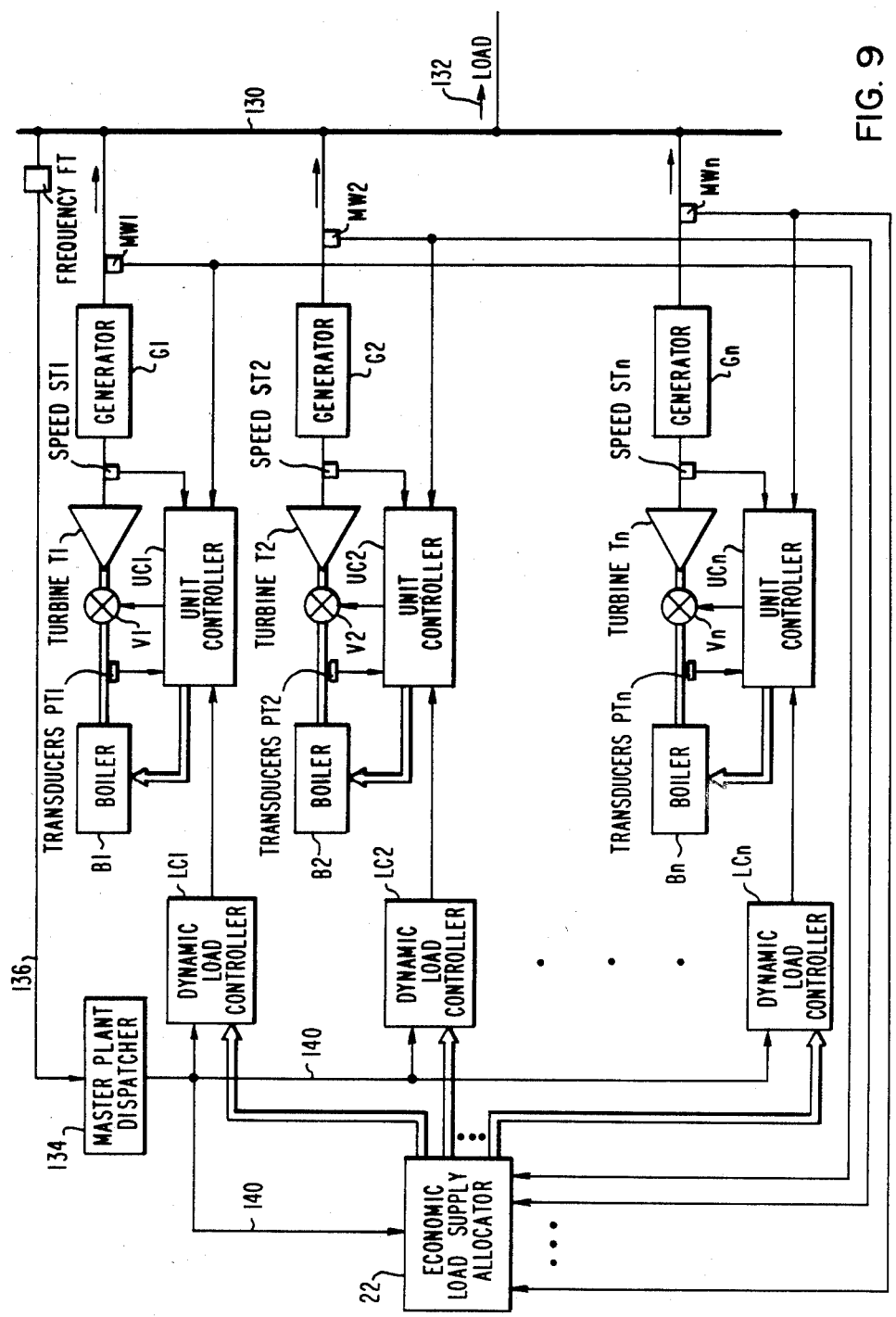
FIG. 9 is a block diagram schematic of a turbogenerator plant suitable for embodying alternatively the principles of the present invention.

While a load allocating system has been described hereabove in connection with a boiler house plant as schematically illustrated in FIG. 1, it is understood that the application of such a system should not be so limited. For example, another application for the load allocating system may be in a turbogenerator plant such as that schematically illustrated in FIG. 9. Referring to FIG. 9, a multiplicity of turbines T1 through Tn are each coupled to and drive a corresponding generator unit G1 through Gn, respectively, which are in turn coupled to a common system bus 130 for supplying system load 132 to a power system network (not shown). Boiler units B1 through Bn supply the energy input to their corresponding turbine T1 through Tn under control of a valve or set of valves V1 through Vn, respectively. The valves V1 through Vn are correspondingly disposed in the piping between the boiler and turbine units associated therewith. Pressure transducers PT1 through PTn are respectively disposed at the corresponding energy supply points of the turbines T1 through Tn for measuring their corresponding pressures and supplying signals representative of these measured pressures to a unit controller UC1 through UCn in each case. Each unit controller monitors generator power or unit load MW and turbine speed utilizing a corresponding power transducer of the set MW1 through MWn and a corresponding speed transducer of the set SP1 through SPn. Thus, the unit controllers UC1 through UCn may control their corresponding boilers B1 through Bn and control the energy input to their corresponding turbo-generating units via the valves V1 through Vn, respectively.

A master plant dispatcher 134 may monitor a parameter, such as the tie line load or electrical frequency of the system bus 130 using a frequency transducer F2 which generates a signal 136 representative of the bus frequency which is conducted to the dispatcher 134. The dispatcher 134 attempts to maintain the bus 130 at a fixed electrical frequency by altering the loads being generated by the turbogenerator units. For example, a drop in frequency may be indicative of an increase in power system load demand and an increase in frequency may indicate the converse.

The dispatcher 34 may respond to a change in the signal 136 by generating a governing signal 140 which is passed through the dynamic load controllers LC1 through LCn to govern their corresponding unit controllers UC1 through UCn, respectively. The governing signal 140 is also supplied to the economic load supply allocator 22 along with the power signals generated from the transducers MW1 through MWn which are representative of the individual loads supplied to the bus 130 from the corresponding turbogenerator units. In a similar manner as that described hereabove, the allocator 22 along with the dynamic load controllers LC1 through LCn dynamically and economically allocate the load among the multiplicity of the turbogenerator units to meet the system load demand during a transition from one steady state loading condition to another.

Figure 10:
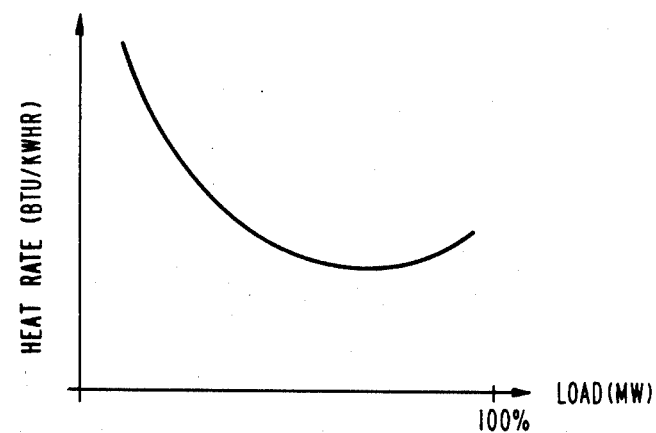
FIG. 10 is a graph of a typical turbogenerator unit load efficiency curve.

A typical turbogenerator unit load efficiency curve which may be derived for each of the turbogenerator units is shown in the graph of FIG. 10. The graph represents a turbogenerator unit's efficiency based on heat rate measured in BTU/KWHR with respect to load measured in MW. Accordingly, the polynomial efficiency coefficients may be determined from a best fit curve and from this a cost of operating each turbogenerator unit may be calculated using the appropriate fuel costing rates. The optimizing procedures and the automatic gain control operations are the same as that described hereabove for the boiler plant application.

Figure 11:
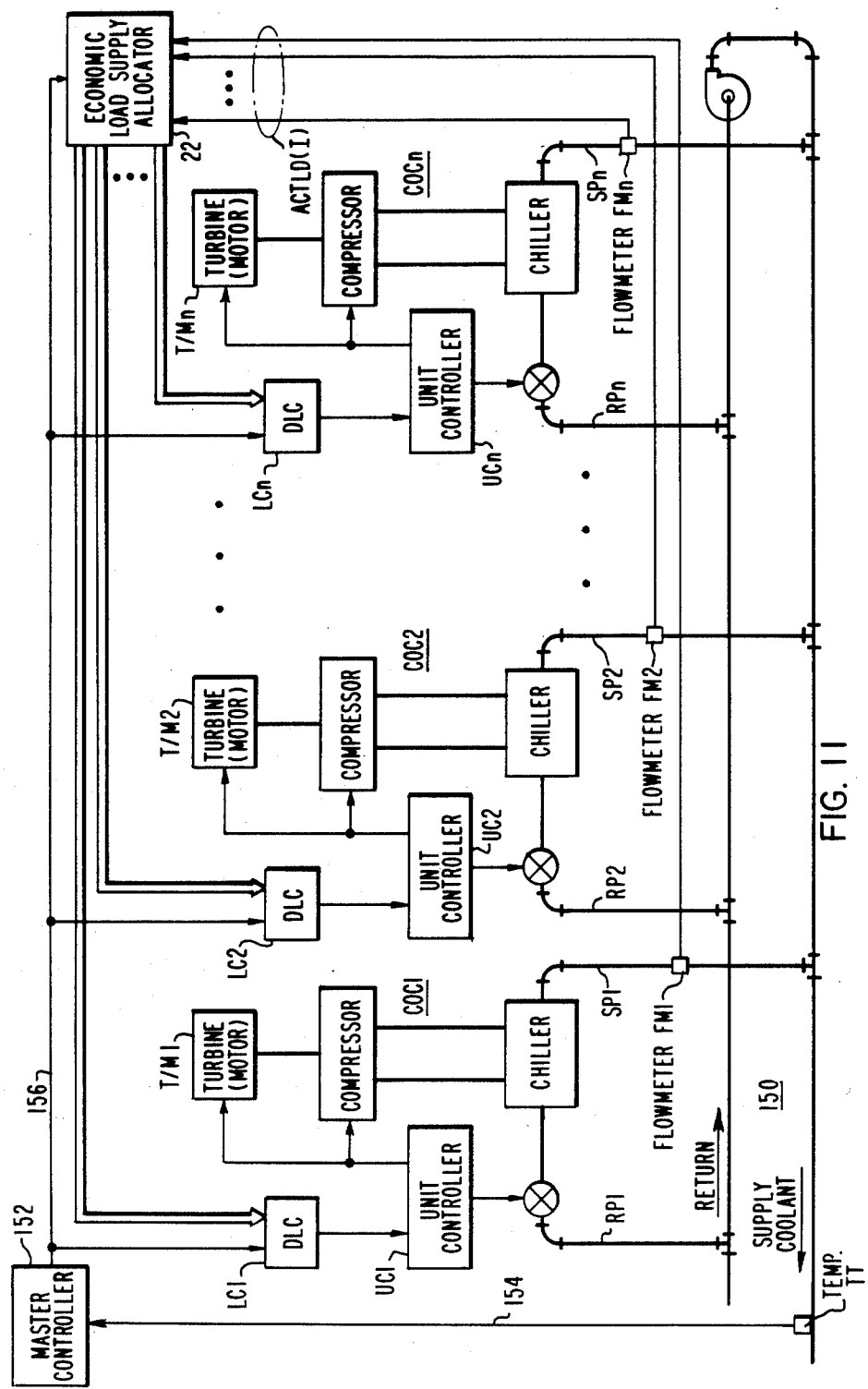
FIG. 11 is a block diagram schematic of a compressor-chiller plant suitable for embodying alternatively the principles of the present invention.

Another application of the economic load allocating system is in a plant including a multiplicity of compressor-chiller units coupled to a common coolant loop for supplying a cooling load upon demand to a process. Such a plant is shown in the schematic illustration of FIG. 11. More specifically, a multiplicity of compressor-chiller units COC1 through COCn are shown coupled to a common coolant loop 150 through return piping RP1 through RPn and supply piping SP1 through SPn, respectively. Coolant fluid is conducted through each chiller from its return piping RP1–RPn and returned to the coolant loop 150 through its supply piping SP1–SPn. Each chiller unit cools the temperature of the fluid conducted therethrough in accordance with the operation of its corresponding compressor.

A turbine or motor unit T/M1 through T/Mn is coupled to each compressor to drive the compressor to achieve the unit cooling rate desired. A multiplicity of unit controllers UC1 through UCn are coupled respectively to the compressor-chiller units and corresponding turbine/motor drives for governing the operation thereof. A master controller 152 monitors the temperature of the coolant loop 150 using a temperature transducer TT which generates a signal 154 representative of the monitored temperature to the controller 152. The master controller 152 attempts to maintain the temperature of the coolant loop 150. Accordingly, a change in the coolant loop temperature is reflective of a transition in the process load demand, that is the process needing more or less heat exchange capability.

In response to a change in the temperature signal 154, the master controller 152 generates the governing signal 156 which is provided to the multiplicity of dynamic load controllers LC1 through LCn corresponding to the compressor-chiller units COC1 through COCn, respectively. The governing signal 156 is also provided to the load supply allocator 22 along with the unit load supply signals ACTLD(I) from the compressor chillers. The unit load supply signals ACTLD(I) are generated from a multiplicity of flow meters FM1 through FMn respectively disposed in the piping system coupling the chillers to the common coolant loop. The load supply allocator 22 operates in cooperation with the dynamic load controllers LC1 through LCn to allocate the load dynamically and economically among the multiplicity of compressor-chiller units to meet the load demands of the common coolant loop 150 during a temperature transition from one steady state loading condition to another.

Figure 12:
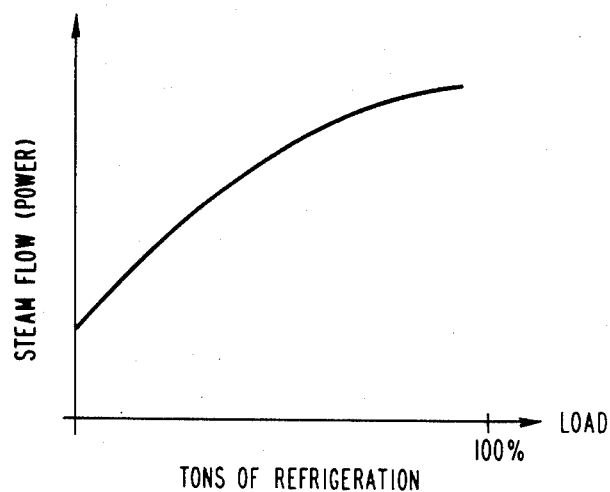
FIG. 12 is a graph depicting an exemplary efficiency curve for a compressor-chiller unit.

An exemplary calculated efficiency curve for a compressor-chiller unit is shown in the graph of FIG. 12. This efficiency curve is measured in terms of steam flow or power with respect to unit load in tons of refrigeration. The automatic gain adjustment of the load controllers LC1 through LCn according to the corresponding signals generated from the load supply allocator 22 is substantially similar to that described in connection with the boiler house plant embodiment using FIGS. 1 through 8.

While the present invention has been described in connection with a number of plant embodiments, it is understood that other plant embodiments which include a multiplicity of energy conversion units coupled to a common junction for supplying load upon demand to a process may also be found suitable for application of the present invention without deviating from its broad principles. Therefore, it is understood that the present invention should not be limited to any single embodiment but rather construed in breadth and broad scope according to the appended claims.

What is claimed is:

1. In a plant including a multiplicity of energy conversion units, each having an energy input and all coupled to a common junction for supplying load upon demand to a process; first control means for generating a first signal to govern said energy conversion units to collectively supply load to the process in accordance with the process load demand; and second control means, corresponding to each energy conversion unit, governed by a corresponding second signal to control the energy input of its corresponding energy conversion unit to achieve a desired unit load supply therefrom which contributes to the process load demand, a system for allocating load dynamically and economically among the multiplicity of energy conversion units to meet the process load demand during a transition from one steady-state loading condition to another, said system comprising:

load allocating means including:
  means for calculating a cost of operating each energy conversion unit across its corresponding load supply spectrum based on corresponding efficiency characteristics of each unit determined from data measurements collected over the load supply spectrum of its corresponding unit;
  means for determining an instantaneous process load demand;
  means for deriving a set of unit load supply signals corresponding to each energy conversion unit to meet said instantaneous process load demand and virtual perturbations therefrom based on an optimal economic unit load supply distribution algorithm using said cost of operating calculations for said instantaneous and virtually perturbed values of process load demand;
  first means for generating at least one gain control signal for each energy conversion unit based on a function of said corresponding set of unit load supply signals;
  second means for generating a bias signal for each energy conversion unit based on a function of at least one signal from said corresponding set of unit load supply signals; and
  third means for generating a demand signal for each energy conversion unit based on a function of said first signal; and load control means for each energy conversion unit, each load control means governed by said first signal to generate said second signal which controls the corresponding energy conversion unit to render a desired unit load supply to meet the change in process load demand during said transition, each load control means including:
  fourth means for generating a third signal based on a function of said first signal and corresponding demand signal;
  means governed by said corresponding at least one gain signal to gain adjust said third signal and render a fourth signal representative of said gain adjusted third signal; and
  fifth means for generating said corresponding second signal based on a function of said fourth and bias signals.

2. The System in accordance with claim 1 wherein the deriving means of the allocating means includes:
  means for deriving base (I), upper (I) and lower (I) unit load supply signals corresponding to each energy conversion unit (I) to meet respectively the instantaneous process demand load, an upper perturbation therefrom and a lower perturbation therefrom based on the optimal economic unit load supply distribution algorithm.

3. The system in accordance with claim 2 wherein the first means of the load allocating means includes: means for generating a first gain signal for each energy conversion unit I to gain adjust its corresponding third signal when said process load demand is increasing, said first gain signal being generated based on a function of base (I) and upper (I); and means for generating a second gain signal for each energy conversion unit I to gain adjust its corresponding third signal when said process load demand is decreasing, said second gain signal being generated based on a function of base (I) and lower (I).

4. The system in accordance with claim 2 wherein the second means of the load allocating means includes means for generating the bias signal for each energy conversion unit I based on a function of base (I).

5. The system in accordance with claim 1 wherein the third means of the load allocating means includes means for setting at times the demand signal substantially equal to the first signal.

6. The system in accordance with claim 1 wherein the fourth means of each load control means includes means for generating the third signal as the difference between the first signal and corresponding demand signal.

7. The system in accordance with claim 1 wherein the fifth means of each load control means includes:
  means for generating a fifth signal as the sum of the third and bias signals; and
  means governed by said fifth signal to ramp the corresponding second signal from one value to another at a predetermined rate.

8. The system in accordance with claim 1 wherein the load allocating means includes means for ramping each bias signal at a corresponding predetermined rate from one value to another.

9. The system in accordance with claim 1 wherein the determining means of the load allocating means includes:
  means for measuring the actual unit load supply of each the multiplicity of energy conversion units and for generating a respective signal representative thereof; and
  means for determining the instantaneous process load demand from a summation of said actual unit load supply signals.

10. The system in accordance with claim 1 wherein each load control means includes a switching means for substituting the first signal for the corresponding second signal to govern the corresponding energy conversion unit; and means for generating a corresponding flag signal to the load allocating means upon said substitution to indicate the unavailability of the corresponding energy conversion unit for optimal economic unit load supply distribution.

11. The system in accordance with claim 1 wherein the deriving means of the load allocating means includes means for deriving the set of unit load supply signals using an equal incremental cost economic unit load supply distribution algorithm.

12. The system in accordance with claim 1 wherein the deriving means of the load allocating means includes means for deriving the set of unit load supply signals using a simplex self-directing evaluationary operation (SSDEVOP) for the economic unit load supply distribution algorithm.

13. The system in accordance with claim 1 wherein the plant includes a multiplicity of boilers as the energy conversion units coupled to a common steam header for supplying steam load upon demand to a process; wherein the first control means includes a master plant controller for monitoring the steam presence of said common steam header and for governing said boilers in response to said monitored steam pressure; and wherein each second control means includes a combustion controller governed by said master plant controller, load allocating means and its corresponding load control means to control the energy input of its corresponding boiler.

14. The system in accordance with claim 1 wherein the plant includes a multiplicity of turbogenerators as the energy control units coupled to a common bus for supplying electrical load upon demand to a power system network; wherein the first control means includes a master plant controller for monitoring a parameter of the bus and for governing said turbogenerators in response to said monitored parameter; and wherein each second control means includes a turbogenerator controller governed by said master plant controller, load allocating means and its corresponding load control means to control the energy input of its corresponding turbogenerator.

15. The system in accordance with claim 1 wherein the plant includes a multiplicity of compressor-chiller units as the energy conversion units coupled to a common coolant loop for supplying a cooling load upon demand to a process; wherein the first control means includes a master plant controller for monitoring the temperature of the common coolant loop and for governing said compressor-chiller units in response to said monitored temperature; and wherein each second control means includes a compressor-chiller unit controller governed by said master plant controller, load allocating means and its corresponding load control means to control the energy input of its corresponding compressor-chiller unit.

* * * * *